United States Patent
Hofmann et al.

(10) Patent No.: US 7,878,421 B2
(45) Date of Patent: Feb. 1, 2011

(54) WASH SYSTEM FOR WINDOW GLASSES AND/OR HEADLAMPS OF A VEHICLE

(75) Inventors: Jurgen Hofmann, Melsungen (DE); Markus Bickel, Morschen (DE); Lutz Seyfarth, Wehretal (DE)

(73) Assignee: Vola Plast Werner Hoppach, KG (DE)

( * ) Notice: Subject to any disclaimer, the term of this patent is extended or adjusted under 35 U.S.C. 154(b) by 139 days.

(21) Appl. No.: 12/351,572

(22) Filed: Jan. 9, 2009

(65) Prior Publication Data
US 2009/0179084 A1    Jul. 16, 2009

(30) Foreign Application Priority Data
Jan. 10, 2008    (DE) ................. 10 2008 003 881

(51) Int. Cl.
*B05B 1/24* (2006.01)
*B05B 1/10* (2006.01)
*B60S 1/46* (2006.01)

(52) U.S. Cl. ............ 239/133; 239/130; 239/284.1; 239/284.2; 392/473; 392/485; 392/488

(58) Field of Classification Search ............ 239/128, 239/130, 132, 133, 135, 266–268, 284.1, 239/284.2; 392/473, 485, 488; 15/250.05–250.09; 219/202, 203
See application file for complete search history.

(56) References Cited

U.S. PATENT DOCUMENTS

| 5,426,814 | A   | * | 6/1995  | Minnick ............... 15/250.04 |
| 6,463,621 | B1  | * | 10/2002 | Zimmer et al. ......... 15/250.04 |
| 7,093,317 | B1  | * | 8/2006  | Zimmer ............... 15/250.04 |
| 2004/0256491 | A1 | * | 12/2004 | Sporer et al. ............ 239/525 |
| 2006/0108447 | A1 | * | 5/2006  | Berger et al. ......... 239/284.1 |

FOREIGN PATENT DOCUMENTS

| DE | 19815171    | 4/1998 |
| DE | 102007007761 | 2/2007 |
| EP | 0667267     | 2/1995 |

* cited by examiner

*Primary Examiner*—Darren W Gorman
(74) *Attorney, Agent, or Firm*—Hanley, Flight & Zimmerman, LLC

(57) ABSTRACT

A wash system for window glasses and/or headlamps of a vehicle, with a fluid line through which a fluid is conducted from a fluid reservoir into a nozzle and with a heating cable which is laid in the fluid line is disclosed. The heating cable is laid so as to enter the nozzle or to pass through the nozzle and to heat not only the fluid line but also the nozzle. One obtains a wash system that can be manufactured at low cost and ensures freeze protection at reduced energy expense by the fact that the heating cable is laid in a meander pattern in the nozzle.

5 Claims, 3 Drawing Sheets

WASH SYSTEM FOR WINDOW GLASSES AND/OR HEADLAMPS OF A VEHICLE

CROSS-REFERENCE TO RELATED APPLICATIONS

This application claims Priority from German Application No. DE 10 2008 003 881.4 filed on Jan. 10, 2008, and incorporated herein by reference in its entirety.

FIELD OF THE DISCLOSURE

The present invention relates to a wash system for window glasses and/or headlamps of a vehicle.

BACKGROUND OF RELATED ART

In wash systems for window glasses and/or headlamps of a vehicle, a problem arising in winter is that the fluid contained therein may freeze or that surface humidity accumulates on the nozzle and freezes. In both cases, fluid can no longer exit the nozzle so that the entire wash system becomes useless. As a solution to this problem the document DE 10 2007 007 761 A1 proposes a coaxial cable that is laid in the fluid line in order to keep it free from ice. In the document EP 0 667 267 A1 it is proposed to thread the heating conductor through the nozzle in order to heat the nozzle, and as a result thereof the fluid contained therein, and to keep them free from ice. If one considers that there is much more fluid in a nozzle than in the fluid line, it appears clearly that much more energy is needed to heat the nozzle than to heat the fluid line. If the heating conductor is devised to keep the nozzle free from ice, the heating conductor is of too large dimensions for the fluid line. If the heating conductor is devised to be just sufficient for the fluid line, the heating power will not suffice to keep the nozzle free from ice.

As a solution to this problem, the document DE 198 15 171 A1 proposes to lay a wire-shaped heating system in the supply hose and in the nozzle body, the heating system being oriented in a helical shape in the interior of the nozzle body. Through this helical laying of the heating system, one achieves a heating wire package of higher density for each travel unit so that the nozzle body is given a higher heating power to heat the nozzle body.

Since the helical heating line is disposed so to say as an extended portion of the fluid line, the heating power is also higher in this region. The nozzle however is of a much wider construction, this being the reason why the heat needs some time to diffuse as far as the nozzle aperture. In practice, such heating conductors are therefore devised to be of a much larger size in order to achieve fast heating of the nozzle aperture as well.

Further, it has been found out that, when mounting said heating conductor, insertion of a one-piece heating conductor configured to be helical in the region of the respective nozzle is only possible at considerable expense.

SUMMARY

In view thereof, it is the object of the present invention to provide a wash system of the type mentioned herein above that can be manufactured at low cost and that ensures freeze protection at reduced energy expense.

As a technical solution to this problem, a wash system having the features of claim 1 is proposed. Advantageous developed implementations of this wash system will become apparent from the dependent claims.

A wash system configured according to this technical teaching offers the advantage that it only needs one single heating cable to heat the fluid line and all the nozzles. Several advantages arise therefrom.

By laying the heating cable in a meander pattern in the nozzle, the heating cable in the nozzle is longer so that the available heating power to keep the fluid free from ice is increased.

Another advantage is that, by virtue of the meander pattern, the heating cable is distributed over the surface in the nozzle chamber so that the heating power is distributed over a larger surface. As a result, the fluid can be heated faster.

In a preferred developed implementation the heating cable is conducted into the fluid chamber of the nozzle through a fluid inlet opening so that the heating cable is laid directly next to the fluid contained in the nozzle in order to heat it.

It has been found advantageous to form two retaining webs in the fluid chamber for the heating cable to be wound about said webs so that a larger portion of the heating cable is laid in the nozzle.

In still another preferred embodiment, the heating cable is laid about a shoulder projecting at the fluid inlet. This also allows for greater length of the heating cable inside the nozzle in order to realize increased heating power inside the nozzle.

Further advantages of the wash system of the invention will become apparent in the appended drawings and in the following description of embodiments thereof. Likewise, the invention lies in each and every novel feature or combination of features mentioned above or described herein after. The embodiments discussed herein are merely exemplary in nature and are not intended to limit the scope of the invention in any manner.

DETAILED DESCRIPTION

Figure 1:
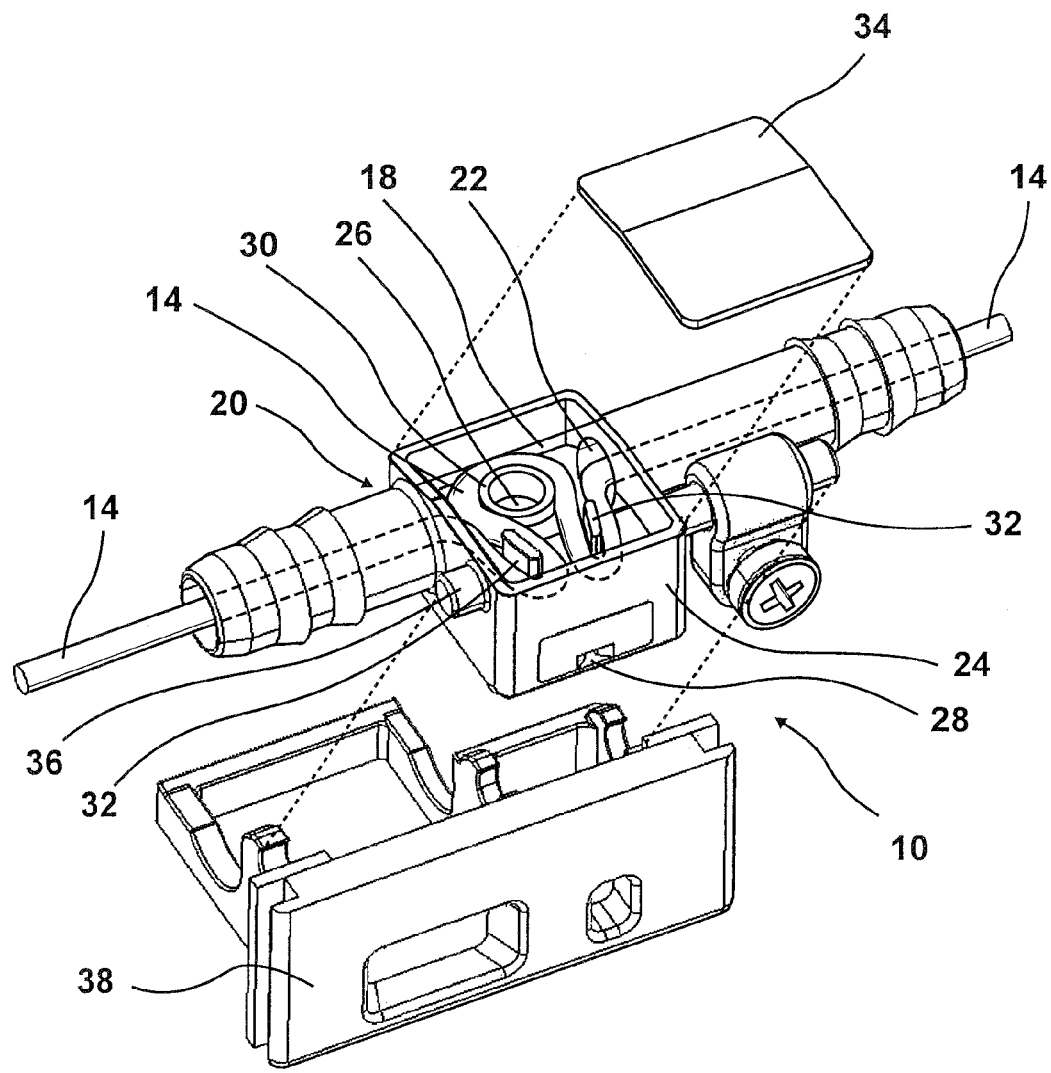
FIG. 1 shows an exploded perspective illustration of the nozzle of the invention with a heating cable laid therein.
Figure 2:
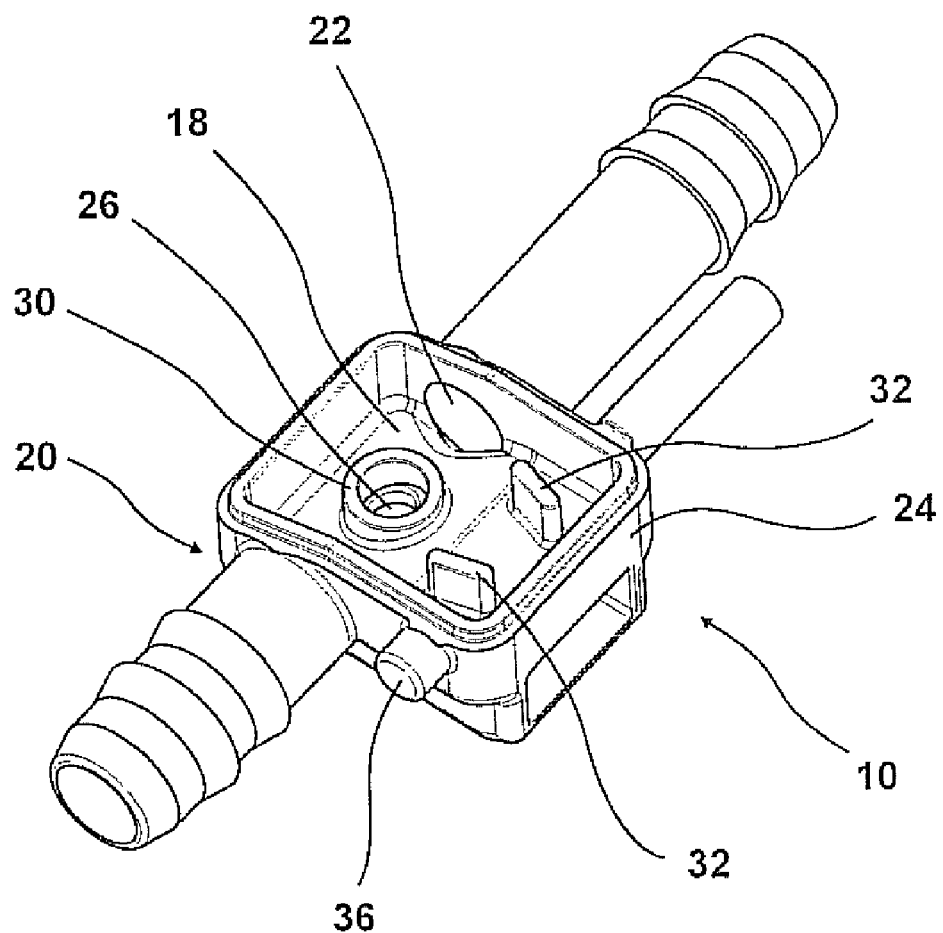
FIG. 2 shows the nozzle of FIG. 1 without heating cable.
Figure 3:
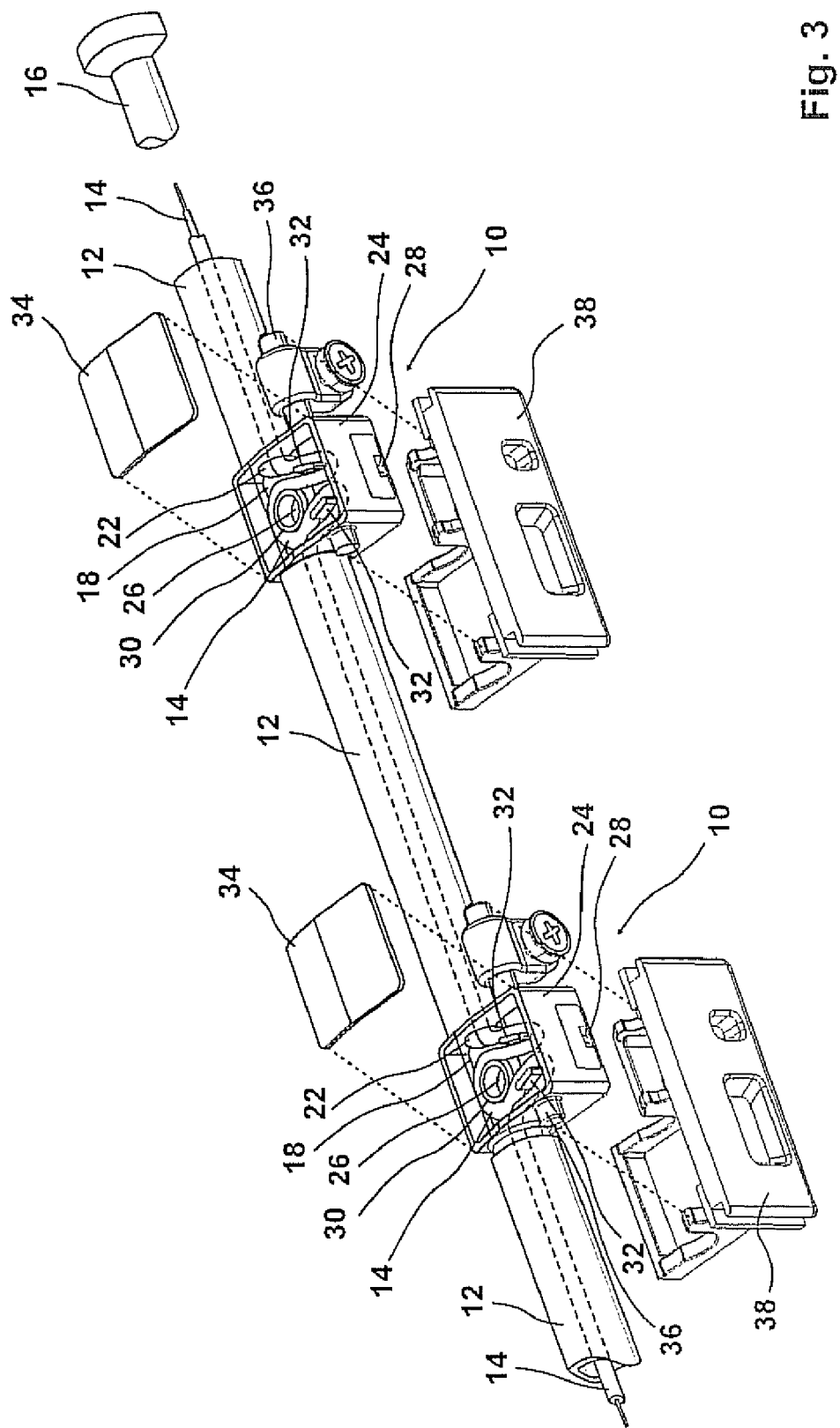
FIG. 3 shows an exploded perspective illustration of the wash system of the invention with a heating cable of FIG. 1 laid therein.

In the FIGS. 1 through 3, there is shown a wash system for window glasses and/or headlamps of a vehicle, which comprises two nozzles 10. In another embodiment that has not been illustrated herein, the wash system can also comprise three or more nozzles.

This wash system incorporates the nozzles 10, a fluid line 12 and a heating cable 14. The fluid line 12 extends from a fluid reservoir, which has not been illustrated in closer detail herein, to the first nozzle 10 and from said first nozzle 10 to the second nozzle 10. A portion of the fluid line 12 also branches from the second nozzle 10 and is closed at its end with a blind plug 16. The heating cable 14 is laid inside the fluid line 12, which is preferably designed as a coaxial cable. This heating cable 14 extends over the entire fluid line and also passes through the interior of the nozzles 10. At the end of the fluid line 12, the heating cable 14 is short-circuited, i.e., the two current-carrying strands of the heating cable 14 configured to be a coaxial cable are joined together so that the entire heating cable 14 can be supplied with appropriate current and delivers heat to the fluid surrounding said heating cable 14.

As can be seen from the FIGS. 1 and 2 a fluid chamber 18 comprising a fluid inlet opening 20 and a fluid outlet opening 22 through which the fluid is allowed to enter and exit the fluid chamber 18 is located inside the nozzle 10. The fluid chamber 18 is thereby bounded by a housing 24 and has a fluid inlet 26 through which the fluid reaches a fluid delivery port 28 which sprays the fluid onto the window glass or the headlamp of the vehicle. A shoulder 30 acting as the guide element for the heating cable 14 is formed about the fluid inlet 26. Simultaneously, two retaining webs 32, which also act as guide elements, are provided inside the fluid chamber.

The heating cable 14 laid in the fluid line 12 enters the fluid chamber 18 through the fluid inlet opening 20 and is laid about the first retaining web 32. Then, the heating cable 14 is laid about the shoulder 30 and about the second retaining web 32 before it leaves the fluid chamber 18 through the fluid outlet opening 22 and enters the fluid line 12. Thanks to the meander pattern in which the heating cable 14 is laid a comparably long length of the heating cable 14 is available inside the fluid chamber 18 for heating the fluid contained in the fluid chamber 18, said length being sufficient to heat the fluid contained in the fluid chamber 18 and also to keep frost-free fluid possibly contained in the fluid delivery port 28.

The fluid chamber 18 is closed with a lid 34 and is retained for pivotal movement in a nozzle mount 38 through detent webs 36. As a result, the fluid delivery port 28 can be adjusted in the desired direction in order to achieve best use of the window glass.

In another embodiment that has not been shown herein, a single-strand cable is laid as the heating cable in the fluid line or in the nozzles instead of the coaxial cable. This single-strand heating cable is laid as a loop so that the required heating current can be supplied to both ends of the heating cable at the same end of the fluid line.

In still another embodiment, the coaxial cable or the single-strand heating cable is laid in the nozzle so as to form a loop. Depending on the heating needed, two or more loops can be provided in each nozzle.

| LIST OF NUMERALS | |
| --- | --- |
| 10 | nozzle |
| 12 | fluid line |
| 14 | heating cable |
| 16 | blind plug |
| 18 | fluid chamber |
| 20 | fluid inlet opening |
| 22 | fluid outlet opening |
| 24 | housing |
| 26 | fluid inlet |
| 28 | fluid delivery port |
| 30 | shoulder |
| 32 | retaining webs |
| 34 | lid |
| 36 | detent webs |
| 38 | nozzle mount |

We claim:

1. A wash system for window glasses or headlamps of a vehicle comprising:
    a fluid line through which a fluid is conducted from a fluid reservoir into a nozzle;
    a heating cable laid in the fluid line, the heating cable being laid so as to enter the nozzle or to pass through the nozzle and to heat not only the fluid line but also the nozzle,
    wherein the heating cable is laid in a meander pattern in the nozzle,
    wherein the heating cable laid inside the fluid line enters a fluid chamber of the nozzle passing through a fluid inlet opening of the nozzle and enters another fluid line extending as a continuation through a fluid outlet opening in a housing of the nozzle; and
    two retaining webs formed in the fluid chamber about which the heating cable is led.

2. A wash system as defined in claim 1, further comprising a fluid inlet formed in the fluid chamber and having a projecting shoulder about which the heating cable is led.

3. A wash system as defined in claim 1, wherein the heating cable is laid in one plane.

4. A wash system for window glasses or headlamps of a vehicle comprising:
    a fluid line through which a fluid is conducted from a fluid reservoir into a nozzle;
    a heating cable laid in the fluid line, the heating cable being laid so as to enter the nozzle or to pass through the nozzle and to heat not only the fluid line but also the nozzle,
    wherein the heating cable is laid in a meander pattern in the nozzle,
    wherein the heating cable laid inside the fluid line enters a fluid chamber of the nozzle passing through a fluid inlet opening of the nozzle and enters another fluid line extending as a continuation through a fluid outlet opening in a housing of the nozzle; and
    a fluid inlet formed in the fluid chamber and having a projecting shoulder about which the heating cable is led.

5. A wash system as defined in claim 4, wherein the heating cable is laid in one plane.

\* \* \* \* \*